(12) United States Patent
Binder et al.

(10) Patent No.: US 9,537,342 B2
(45) Date of Patent: Jan. 3, 2017

(54) METHOD AND DEVICE FOR CHARGING BATTERIES BY LINEARLY INCREASING THE CHARGING VOLTAGE

(71) Applicant: Fronius International GmbH, Pettenbach (AT)

(72) Inventors: Juergen Binder, Scharnstein (AT); David Eitelsebner, Klaus (AT)

(73) Assignee: Fronius International GmbH, Pettenbach (AT)

( * ) Notice: Subject to any disclaimer, the term of this patent is extended or adjusted under 35 U.S.C. 154(b) by 48 days.

(21) Appl. No.: 14/427,676

(22) PCT Filed: Sep. 9, 2013

(86) PCT No.: PCT/AT2013/050176
§ 371 (c)(1),
(2) Date: Mar. 12, 2015

(87) PCT Pub. No.: WO2014/040104
PCT Pub. Date: Mar. 20, 2014

(65) Prior Publication Data
US 2015/0249349 A1    Sep. 3, 2015

(30) Foreign Application Priority Data

Sep. 13, 2012  (AT) .................................. 50382/2012

(51) Int. Cl.
*H01M 10/44*  (2006.01)
*H01M 10/46*  (2006.01)
(Continued)

(52) U.S. Cl.
CPC .............. *H02J 7/007* (2013.01); *H01M 10/06* (2013.01); *H01M 10/44* (2013.01); *H02J 7/041* (2013.01);
(Continued)

(58) Field of Classification Search
CPC ...... H02J 7/0026; H02J 7/0021; H02J 7/0042; H02J 7/355; H02J 7/0075; H02J 7/0057
(Continued)

(56) References Cited

U.S. PATENT DOCUMENTS 5,589,757 A    12/1996  Klang
5,650,710 A     7/1997  Hotta
(Continued)

FOREIGN PATENT DOCUMENTS

CN        2377688 Y    5/2000
CN        1512619 A    7/2004
(Continued)

OTHER PUBLICATIONS

International Search Report of PCT/AT2013/050176, mailed Aug. 22, 2014.
(Continued)

*Primary Examiner* — Edward Tso
(74) *Attorney, Agent, or Firm* — Collard & Roe, P.C.

(57) ABSTRACT

A method and to a device for charging batteries, in particular lead-acid batteries, having a predetermined end-of-charge voltage ($U_{LS}$). In order to charge the battery as efficiently and smoothly as possible, and in order to increase the service life of the battery, according to the invention the charge state of the battery is established before the charging process and a charging current ($I_L$) or a charging voltage ($U_L$) is applied to the battery during the charging process and is regulated in such a manner that the charging voltage ($U_L$) is increased during a predetermined charging time ($t'_{charge}$) between a charge starting voltage ($U_{LA}$) and the end-of-charge voltage ($U_{LS}$).

23 Claims, 9 Drawing Sheets

(51) Int. Cl.
*H02J 7/00* (2006.01)
*H01M 10/06* (2006.01)
*H02J 7/04* (2006.01)
*H02J 7/10* (2006.01)

(52) U.S. Cl.
CPC .............. *H02J 7/045* (2013.01); *H02J 7/0093* (2013.01); *H02J 2007/105* (2013.01); *Y02E 60/126* (2013.01); *Y02T 10/7016* (2013.01)

(58) Field of Classification Search
USPC ........ 320/107, 114, 115, 130, 131, 133, 160
See application file for complete search history.

(56) References Cited

U.S. PATENT DOCUMENTS

| | | | |
|---|---|---|---|
| 6,307,352 B1 * | 10/2001 | Hooper | H02J 7/0093 320/139 |
| 2002/0113595 A1 | 8/2002 | Sakai et al. | |
| 2009/0184692 A1 | 7/2009 | Owens, Jr. et al. | |
| 2009/0248331 A1 | 10/2009 | Barsukov | |
| 2010/0066309 A1 | 3/2010 | Labrunie et al. | |
| 2012/0098501 A1 | 4/2012 | Paryani | |

FOREIGN PATENT DOCUMENTS

| | | |
|---|---|---|
| CN | 101677144 A | 3/2010 |
| CN | 202014109 U | 10/2011 |
| DE | 10 2009 051 731 A1 | 5/2011 |
| DE | 10 2011 013 967 A | 1/2012 |
| EP | 1 104 074 A1 | 5/2001 |
| EP | 1 265 335 A2 | 12/2002 |
| EP | 2 244 329 A1 | 10/2010 |
| JP | 2008-61373 A | 3/2008 |
| WO | 96/16460 A1 | 5/1996 |

OTHER PUBLICATIONS

Austrian Office Action in A 50382/2012, dated Aug. 29, 2013, with English translation of relevant parts.
Chinese Office Action in CN 201380057844.3, dated Sep. 26, 2016.

* cited by examiner

METHOD AND DEVICE FOR CHARGING BATTERIES BY LINEARLY INCREASING THE CHARGING VOLTAGE

CROSS REFERENCE TO RELATED APPLICATIONS

This application is the National Stage of PCT/AT2013/050176 filed on Sep. 9, 2013, which claims priority under 35 U.S.C. §119 of Austrian Application No. A 50382/2012 filed on Sep. 13, 2012, the disclosure of which is incorporated by reference. The international application under PCT article 21(2) was not published in English.

The invention relates to a method and a device for charging batteries, in particular lead-acid batteries, with a predetermined end-of-charge voltage.

In principle, the invention concerned here is suitable for charging a wide variety of chargeable primary and secondary batteries, for example lead-acid batteries, lithium batteries, nickel metal hydride (NiMH) batteries and many more. In the case of lead-acid batteries, such as those used for electrically driven vehicles, for example, the charging process according to the invention and the charging device according to the invention is particularly advantageous, however, on account of the high dependence of the internal resistance of such batteries on the charge state.

In the case of electrically operated vehicles or means of transport, such as so-called industrial vehicles (stackers, elevating trucks, etc.), for example, which are frequently used in shift work, routine charging of the batteries between the operating or shift times is necessary. The batteries are usually charged irrespective of their charge state. The internal resistance of batteries, particularly that of lead-acid batteries, exhibits a strong dependence on the charge state in each case, due to the chemical processes in the cells of the battery. In particular, the internal resistance is higher when there is little charge in the battery, is at a minimum when there is a medium charge state and then rises again depending on the charge state. In addition, the internal resistance of batteries is also heavily dependent on the operating temperature and age of the battery.

Customary battery charging processes take no account of the charge state of the battery in each case and the present internal resistance, which is why there is no optimum, gradual charging of the battery and the service life of the battery is reduced as a result. Batteries are frequently charged using a constant charging current. For example, EP 2 244 329 A1 describes a charging process for charging a battery with an uninterrupted power supply, wherein the charging parameters are adjusted to the age of the battery and during temperature changes in a correspondingly dynamic fashion.

During charging with a constant charging current, a battery's internal resistance is high to begin with when the battery is discharged, which is why there is greater heating of the battery, causing it to age as a consequence.

Improvements can be achieved when the current charging voltage of the battery is taken into account during the charging process. For example, WO 96/16460 A1 or DE 10 2009 051 731 A1 describe battery charging processes and devices of this kind.

Particularly when charging the batteries of industrial vehicles, a defined charging time is usually available for charging batteries between the individual working shafts in different shift patterns. However, because no account is taken either of the current charge state or of the age of the battery, the battery is routinely heated excessively, resulting in increased aging (Arrhenius Law). The chemical reactions that take place in the battery are not therefore put to optimum use.

The problem addressed by the present invention is therefore that of creating a method and a device for charging a battery, in particular a lead-acid battery, by means of which the charging efficiency and therefore the performance is increased and the service life of the battery can be extended. In particular, optimum charging of the battery should be facilitated with an adequate charging time. The disadvantages of known charging systems should be eliminated or at least reduced.

The problem is solved according to the invention by a method referred to above for charging a battery, wherein the charge state of the battery is determined before the charging process and a charging current or a charging voltage is applied to the battery during the charging process, which current or voltage is controlled in such a manner that the charging voltage is increased over a predetermined charging time between a start-of-charge voltage according to the state of charge of the battery and the end-of-charge voltage. The current charge state of the battery is therefore determined before the actual charging process and the charging current or the charging voltage are then adapted to this charge state of the battery and to the preset or predetermined charging time. Rather than the battery being charged with a constant charging current, irrespective of the charge state of the battery, the method according to the invention takes account of the actual charge state of the battery and the possible charging time and adapts the charging to these two parameters accordingly. Because the increase in the charging voltage between the start-of-charge voltage and the end-of-charge voltage of the battery during the charging time takes place through the corresponding control of the charging current or the charging voltage, account is taken indirectly of the battery's current internal resistance. Consequently, the battery is charged gradually, putting the available charging time to optimum use. Consequently, there is only minimal warming of the battery and therefore minimal aging, which is why the service life of the battery can be increased. The method according to the invention means that increases in charging efficiency in the range of between 5 and 15% can be achieved. The method can be implemented relatively easily. In particular, modern battery chargers with integrated microprocessors for controlling the charging processes and corresponding control accuracy can be substantially converted accordingly by simple software updates. In the simplest case, the start-of-charge voltage may correspond to the battery's open circuit voltage or a voltage exhibited by the battery once it has run through a process prior to implementation of the charging process, for example a depolarisation process.

The charging current or the charging voltage is advantageously controlled in such a manner that the charging voltage is increased linearly during the charging time between the start-of-charge voltage and the end-of-charge voltage. This enables the charging process to be easily implemented, in that a ramp in the charging voltage is generated between the start-of-charge voltage and the end-of-charge voltage over the predetermined charging time. If, for example, the battery is no longer charged at the beginning and therefore exhibits a relatively high voltage, the gradient of the voltage ramp is reduced, but the full charging time is nevertheless substantially utilized. Because the voltage ramp is realized by a corresponding control of the charging current or the charging voltage, there is also an automatic adjustment to the internal resistance of the battery in each case. Deviations from the linear profile of the charging voltage may be advantageous for certain applications and possibly bring with them still further increases in efficiency. The control may also provide that the voltage ramp is divided into a plurality of partial ramps with a different gradient, in order to balance out the emergence of an excessively high charging current in the battery's minimum internal resistance phase, for example.

If the charging current or the charging voltage is controlled in such a manner that the charging voltage is continuously increased during the charging time, practically no measurement of the battery's internal resistance need be carried out; only the voltage ramp needs to be generated during the charging time through corresponding control of the charging current or the charging voltage. The increase in the charging voltage over the charging time is usually constant, but it could also be performed in discrete steps.

Rather than a continuous increase in the charging voltage, the charging current or the charging voltage may also be increased incrementally during the charging time, wherein the internal resistance of the battery is measured by means of current and voltage pulses and the charging current or the charging voltage is adjusted accordingly to the measured internal resistance. With a discontinuous charging process of this kind, even better account can be taken of the actual state of the battery and charging can take place with optimum efficiency. In principle, the charging process may take place both through imposed current pulses and also through imposed voltage pulses, wherein the resulting charging voltage is increased during the predetermined charging time between the start-of-charge voltage according to the charge state of the battery and the end-of-charge voltage. The battery's internal resistance is measured during the pulse intervals. When current pulses are imposed, this can take place through the measurement of the voltage response which results when the current value is reduced to a predetermined value or to zero.

According to a feature of the invention, a message is displayed when the charging current required to achieve the charging voltage during the charging time is above a maximum possible charging current. If the charging current is not sufficient for the predetermined charging time, it would not be possible to charge the battery fully in this charging time. The message makes the user aware of this, so that he can increase the charging time accordingly, for example.

It is advantageous in this case for a corresponding lower threshold value for the charging time to be displayed within which the battery can be charged with the maximum possible charging current until the end-of-charge voltage is reached. By displaying of the lower charging time threshold value, the user is aware of the minimum time within which the battery can be made available again in a fully charged state. This is particularly relevant during the routine use of batteries in a shift operation, during use in industrial vehicles, for example.

In the simplest case, the charge state of the battery may be determined by measuring the current open-circuit voltage. The current open-circuit voltage can then be used as the start-of-charge voltage or methods can be used which prepare the battery for the charging process (for example, the depolarisation method) and the resulting battery voltage can then be used as the start-of-charge voltage. Instead of measuring the current open-circuit voltage to establish the charge state of the battery, this can also be carried out by means of an acid density determination, ampere-hour balancing or impedance measurement.

Advantages can be achieved when the battery is depolarized prior to the charging process, when the open-circuit voltage lies below a predetermined threshold value, in that the charging current or the charging voltage is controlled in such a manner that a voltage ramp is produced between the battery's open-circuit voltage and a defined depolarisation voltage. Through depolarisation of this kind, a battery's "displaced" electrode potential can be brought back into balance. The battery's voltage resulting following the depolarisation process then corresponds to the start-of-charge voltage of the charging process.

The depolarisation voltage ramp may be repeated at least once. The duration of the depolarisation process is chosen as a fraction of the total charging time available. For example, the depolarisation duration during a charging duration of a few hours can be chosen to be in the region of a few minutes.

Once the charging process is complete and the end-of-charge voltage has been reached, recharging can take place so that the battery is fully charged. Various customary methods can be used for recharging or fully charging the battery.

Rather than entering the desired charging time, the desired time by which the battery should be fully charged can be entered or specified and the charging time determined as the difference between this predetermined end time of the charging process and the current time. This makes the charger easier to handle, as the user no longer has to calculate the available charging time, but simply has to indicate when he requires the battery to be fully charged. A facility of this kind is particularly advantageous in the case of shift working.

The predetermined charging time can be reduced to a fraction, in particular to 50% to 90% of the predetermined charging time, in order still to have sufficient time for any depolarisation process or other procedures. A shortening of the definitive charging time of this kind also makes it possible to ensure that the battery is fully charged even before the agreed time and can be fitted into an industrial vehicle in good time before a shift begins, for example.

If the start of the charging process is delayed by a period of time, a financial advantage can be achieved by exploiting cheaper off-peak electricity, for example.

In this case, a maximum possible interval of time for delaying the charging process can be suggested and displayed.

In this way, the user can be offered the possibility of utilizing cheaper off-peak electricity, for example. The user must then set the delay by actuating the battery charging device accordingly.

The problem according to the invention is also solved by an aforementioned battery charging device, wherein a device for determining the charge state of the battery is provided, furthermore the charging time can be specified on the input/output device and the control device for controlling the charging current or the charging voltage is configured so that the charging voltage is increased during the battery's predetermined charging time between a start-of-charge voltage according to the battery's charge state and the end-of-charge voltage. A battery charging device of this kind can be realized easily and cost-effectively. For example, a battery charging device of this kind can be realized with the given control accuracy by a corresponding software update of the control device. The desired charging time can be entered via the customary input/output device.

For an optimum input and output facility and flexible adaptability to the requirements in each case, it is advantageous for the input/output device to be created by a touchscreen.

For further features and advantages of a battery charging device for carrying out the above battery charging procedure, reference is made to the above description of the charging process and the following description of exemplary embodiments.

The present invention is explained in greater detail with the help of the attached drawings. In the drawings.

Figure 1:
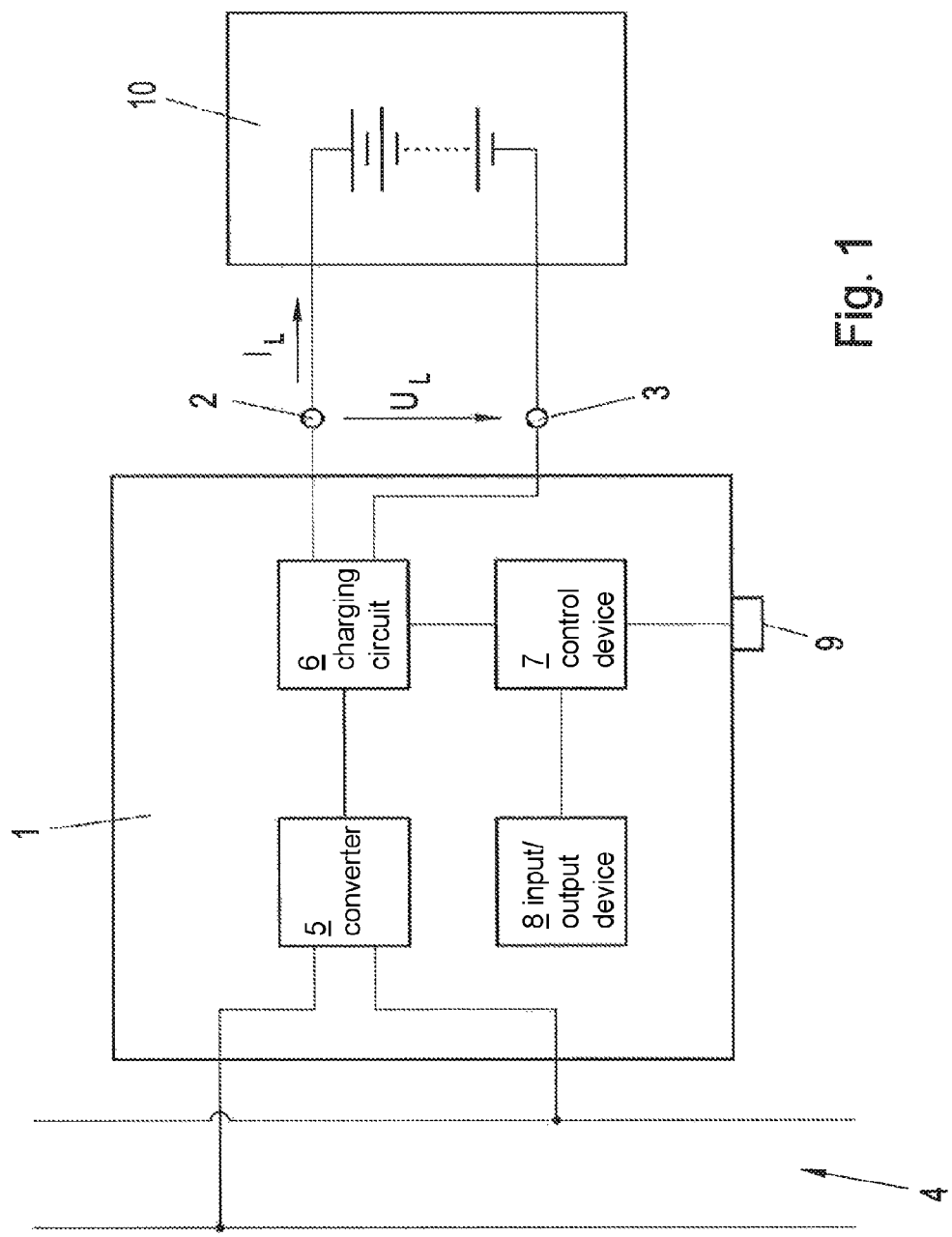
FIG. 1 shows a block diagram of a device for charging a battery.

FIG. 1 shows a block diagram of a device 1 for charging a battery 10. The battery charging device 1 comprises terminals 2 and 3 for connecting to the battery 10 to be charged. The battery charging device 1 is customarily connected to the AC voltage supply 4 and the AC voltage from the AC voltage supply 4 is converted in a corresponding converter 5. The charging current $I_L$ and the charging voltage $U_L$ required for the battery 10 is generated in a charging circuit 6 which may be configured in different ways. A control device 7 which may be formed by a microprocessor, for example, assumes control of the charging circuit 6. The input of the necessary parameters and the output or display of information on the charging process takes place by means of an input/output device 8 which may take the shape of a touchscreen, for example. Data can be read out or loaded into the battery charging device 1 via an interface 9 which is connected to the control device 7. For example, the interface 9 may be formed by a USB (Universal Serial Bus) interface via which software updates for the control device 7 can also be performed. The interface 9 may likewise be created by an Ethernet interface or the like, by means of which the battery charging device 1 can be connected to a network, particularly the Internet.

Figure 2:
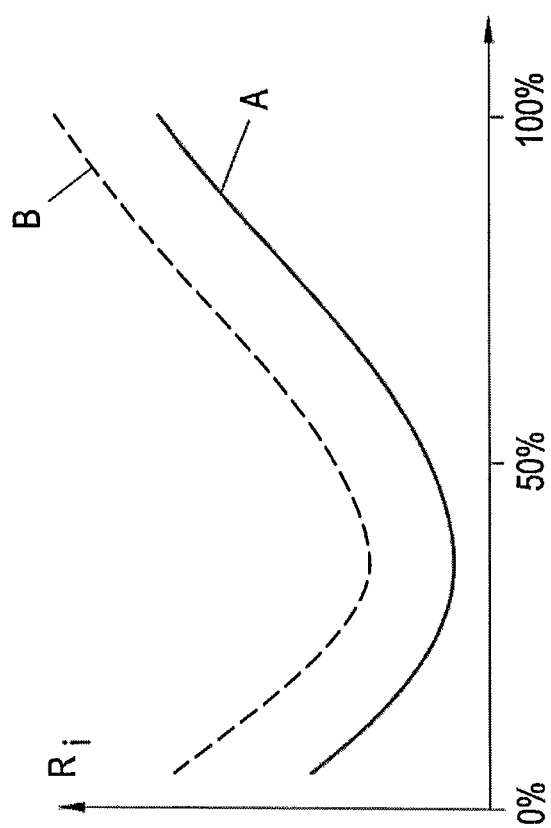
FIG. 2 shows the customary profile of the internal resistance of a lead-acid battery as a function of the charge state and age of the battery.

FIG. 2 shows the customary profile of the internal resistance $R_i$ of a lead-acid battery as a function of the charge state and age of the battery. Curve A shows the internal resistance $R_i$ of a lead-acid battery as a function of the charge state for a new battery. With a medium state of charge (roughly 40% in this case), the internal resistance $R_i$ is at a minimum. Both in the case of a relatively low charge state and also a relatively high charge state, the internal resistance $R_i$ rises on account of different chemical reactions in the battery. If the battery is charged with a constant current, as is customary, without taking account of the battery's internal resistance $R_i$ in each case, relatively high losses occur during the charging process and the battery is heated to a greater extent. The heating of the battery in turn leads to greater battery corrosion and to a reduction in its service life (Arrhenius Law). Curve B shows the profile of the internal resistance $R_i$ of an older battery as a function of the charge state, which curve is arranged above the curve A of the new battery, as the internal resistance $R_i$ increases with the age of the battery. Moreover, there exists a strong correlation between the internal resistance $R_i$ of batteries and the heating in each case. As the temperature rises, the internal resistance $R_i$ of the battery usually drops.

Figure 3:
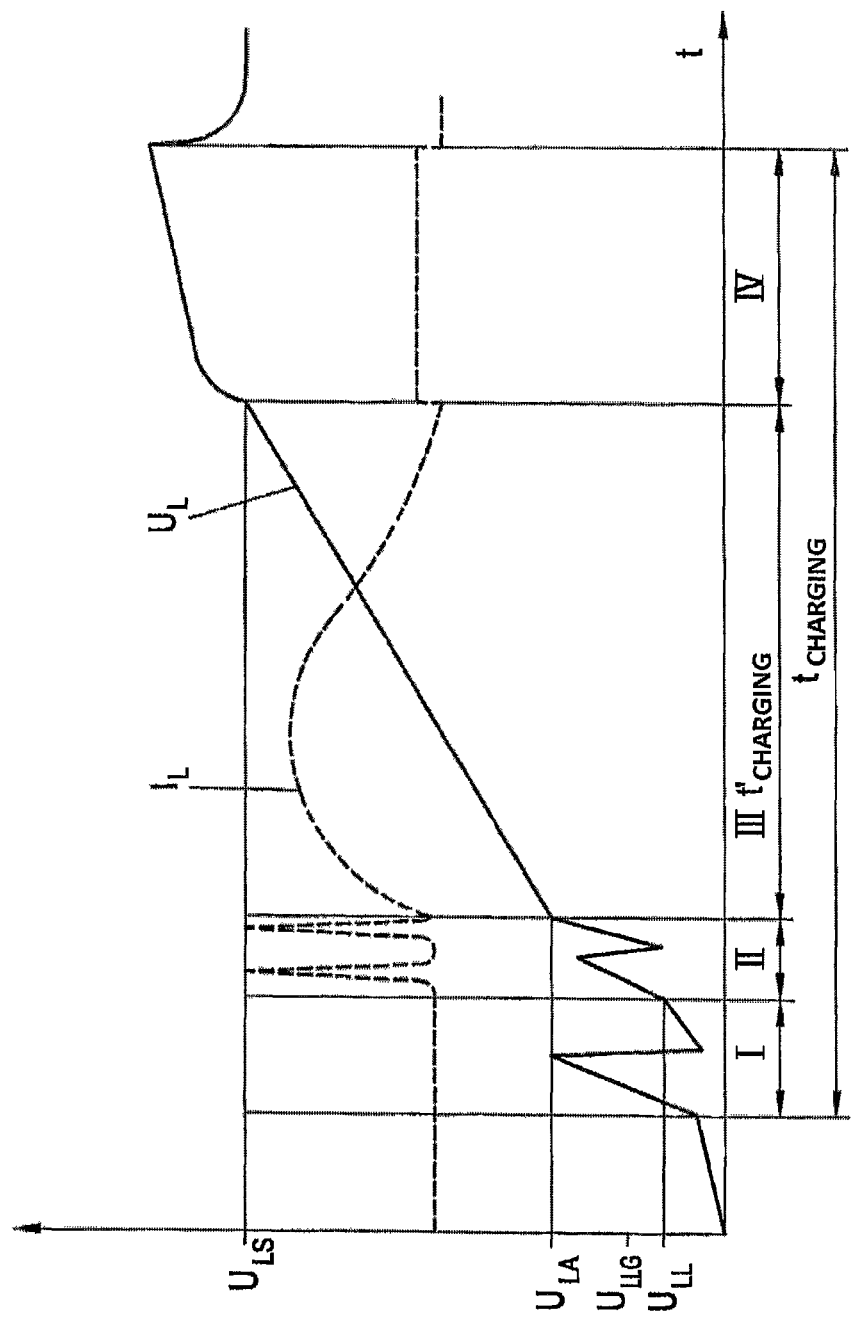
FIG. 3 shows a schematic time diagram of a charging process according to the invention.

FIG. 3 shows a schematic time diagram of the charging current $I_L$ and the charging voltage $U_L$ of a battery charging process according to the invention. The charging process comprises four phases, for example, which are denoted using Roman numerals. In phase I the charge state of the battery is determined by determining the open-circuit voltage $U_{LL}$, for example. In addition, checks are made during the test procedure as to whether the battery charging device is actually capable of providing the charging current $I_L$ required to charge the battery within the preset or prescribed charging time $t'_{charging}$. This involves applying voltage ramps before the start of the charging phase III. The duration of the voltage ramps bears a certain relationship to the predetermined charging time $t'_{charging}$. The voltage ramps may be repeated once or multiple times and the current is measured at the end of the voltage ramp. With the help of the measured current, the maximum charging current $I_L$ during the charging phase III can be estimated. If the charging current $I_L$ cannot be supplied by the battery charging device, the final charging time $t'_{charging}$ must be increased accordingly. This may be specified, for example, by displaying a lower threshold value for the charging time $t_{charging,min}$ on the battery charging device.

Prior to the actual charging phase III (main charging phase), a depolarisation of the battery may be carried out according to phase II. This phase is particularly carried out when the battery's open-circuit voltage $U_{LL}$ is below a given threshold value $U_{LLG}$. During the depolarisation phase II, voltage ramps are applied to the battery, as a result of which a displaced electrode potential of the battery can be brought back into balance. The duration of the depolarisation phase II is chosen as a fraction of the actual charging time $t'_{charging}$. At the end of the depolarisation phase II, the actual charging process III begins. The battery voltage resulting after the depolarisation phase II is then the start-of-charge voltage $U_{LA}$ of the charging phase III. If no depolarisation phase II is performed, the open-circuit voltage $U_{LL}$ of the battery would be used as the start-of-charge voltage $U_{LA}$.

According to the invention, the charging voltage $U_L$ is increased during the charging time $t'_{charging}$ between the start-of-charge voltage $U_{LA}$ and the end-of-charge voltage $U_{LS}$ determined by the battery. The end-of-charge voltage $U_{LS}$ depends on the battery technology used, the number of cells and also the battery temperature. In the example illustrated, the charging voltage $U_L$ is increased continuously and linearly between the start-of-charge voltage $U_{LA}$ and the end-of-charge voltage $U_{LS}$ during the charging time $t'_{charge}$. In order to achieve a linear profile of this kind for the charging voltage $U_L$, the charging current $I_L$ or the charging voltage $U_L$ must be controlled accordingly, so that the desired profile of the charging voltage $U_L$ is produced, as illustrated. Through the corresponding control, the battery's internal resistance $R_i$ is indirectly taken into account, although it is not actually measured. By taking account of the changing internal resistance $R_I$ during the charging process III, the charging losses and therefore the heating of the battery can be reduced significantly. As a consequence, the battery's service life can be correspondingly increased. The definitive time t' charging of the main charging process III is a fraction of the total charging time $t_{charging}$ available, for example 50-80% thereof. The net time for the charging process III is denoted as $t'_{charging}$.

At the end of the main charging process in phase III, a recharging process IV to achieve full charging may be added on. In this case, various known methods of recharging or fully charging the battery can be used.

Figure 4:
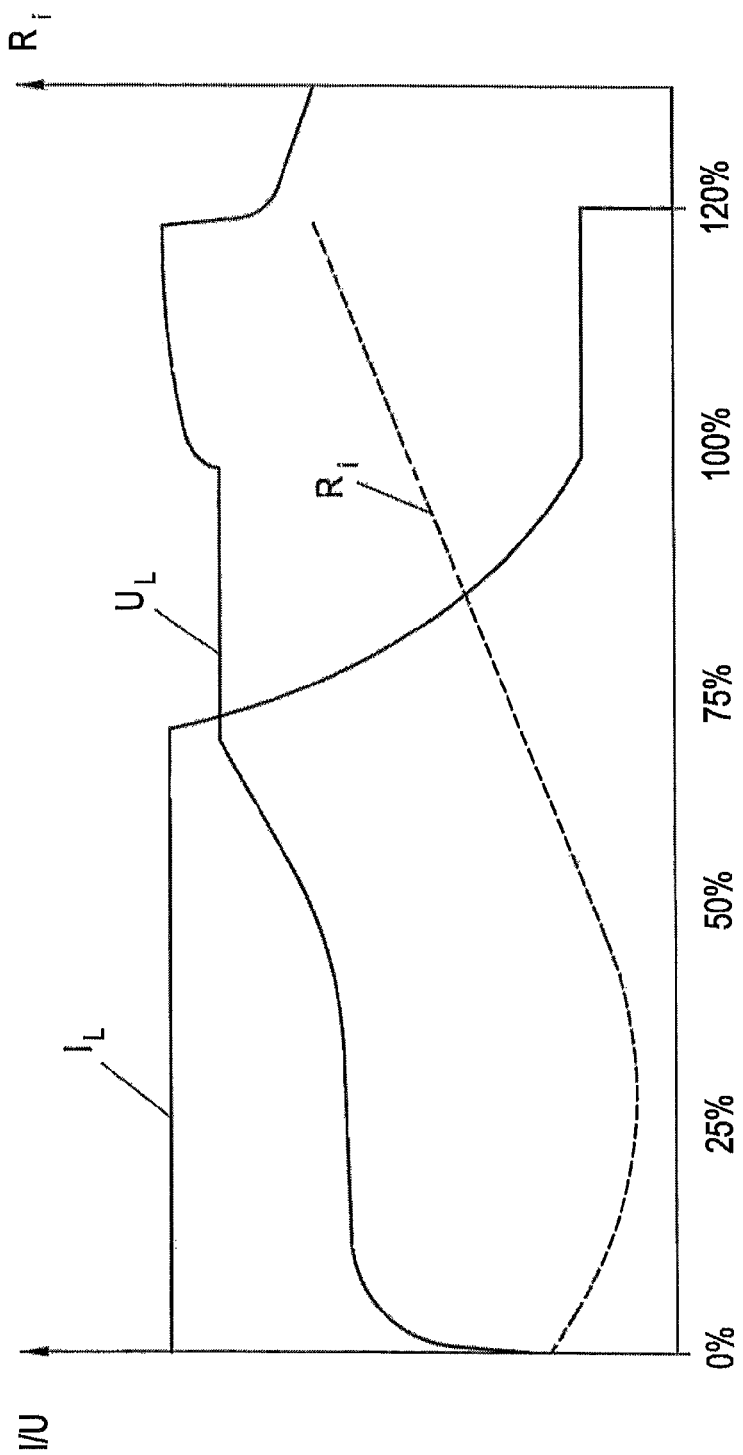
FIG. 4 shows the profiles of the charging current, the charging voltage and the internal resistance of a battery as a function of the charge state for a conventional charging process involving a constant current.

FIG. 4 shows the profiles of the charging current $I_L$ of the charging voltage $U_L$ and of the internal resistance $R_i$ of a battery as a function of the charge state with a conventional charging process involving a constant charging current $I_L$. Where there is a standard charging process of this kind, the battery is charged using a constant charging current $I_L$, which is why a corresponding profile for the charging voltage $U_L$ results as a function of the complex internal resistance $R_i$ of the battery. The changing internal resistance $R_i$ of the battery is not taken into account during the charging phase. Up to a certain charging voltage $U_L$, the charging current $I_L$ remains constant (current-constant) or substantially constant (power-constant). Different charging losses therefore arise during charging which lead to different battery heating, particularly to increased heating, which reduces the service life of the battery.

Figure 5:
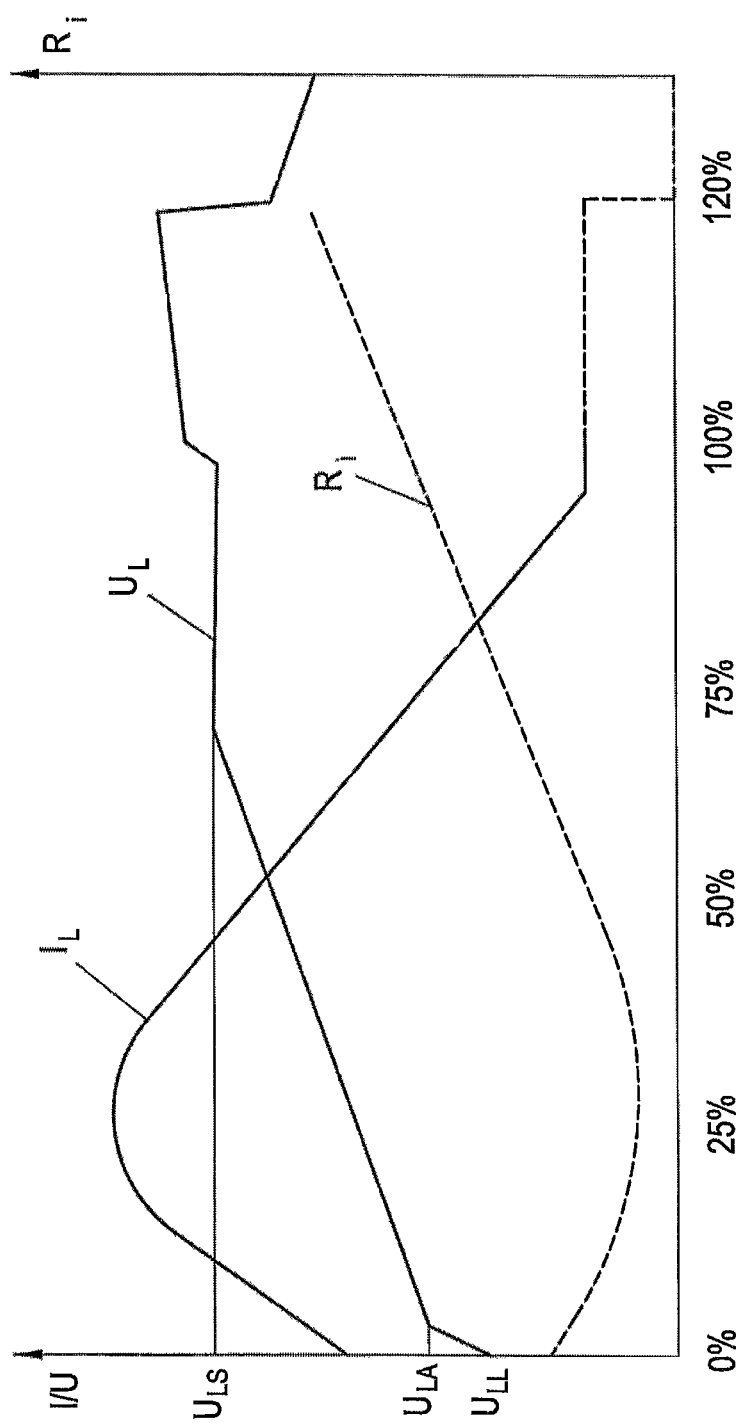
FIG. 5 shows the profiles of the charging current, the charging voltage and the internal resistance of a battery as a function of the charge state in the charging process according to the invention.

Compared with this, FIG. 5 shows the profiles of the charging current $I_L$, of the charging voltage $U_L$ and of the internal resistance $R_i$ of a battery as a function of the charge state in the charging process according to the invention. Following the test procedure and the depolarisation process, if there is one, the charging voltage $U_L$ is increased from the battery's start-of-charge voltage $U_{LA}$ to the end-of-charge voltage $U_{LS}$. In order to achieve a profile of the charging voltage $U_L$ of this kind, the charging current $I_L$ must be correspondingly controlled, as a result of which the changing internal resistance $R_i$ is automatically taken into account. A profile of the charging current $I_L$ therefore results which is at a maximum when there is a substantially medium charge state (roughly 30-40% in this case). Losses during charging can be reduced by this charging process and the battery heating can therefore also be reduced, which has a positive effect on the service life of the battery. The internal resistance $R_i$ of the battery is not measured during the charging process. Unlike with a continuous rise in the charging voltage $U_L$, this may, however, also be increased via current pulses or voltage pulses and the internal resistance $R_i$ of the battery measured or calculated between the current or voltage pulses and the next current pulse or voltage pulse adapted to the measured internal resistance $R_i$ (see FIG. 8).

Figure 6:
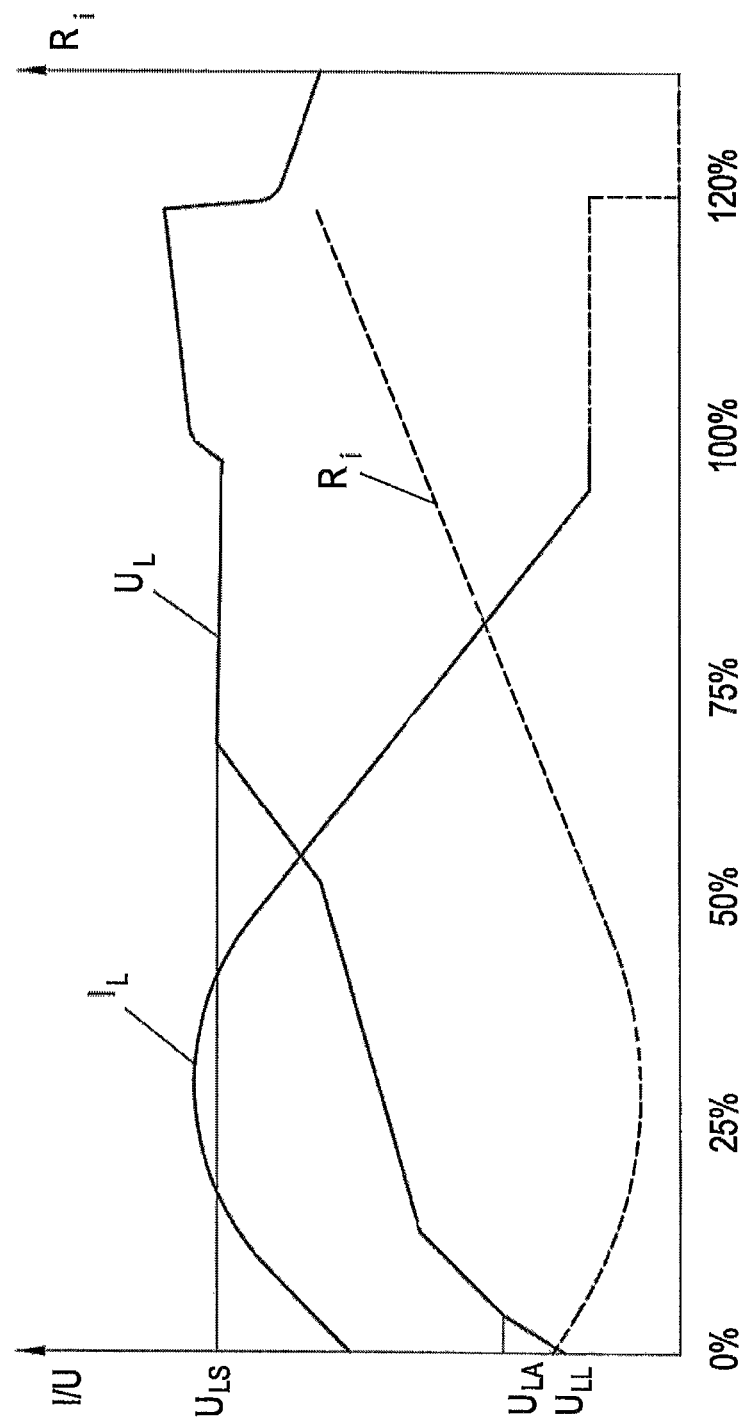
FIG. 6 shows a variant of the charging process with a voltage ramp with different gradients.

FIG. 6 shows a variant in relation to the charging process according to FIG. 5, in which the control of the charging current $I_L$ or the charging voltage $U_L$ takes place in such a way that the ramp-shaped charging voltage $U_L$ exhibits different portions with different gradients. In the exemplary embodiment shown, the charging process begins with a steeper rise in the charging voltage $U_L$, it then changes into a portion with a shallower gradient and again ends with a section with a steeper rise in the charging voltage $U_L$ up to the end-of-charge voltage $U_{LS}$. Through this kind of flattening of the ramp in the charging voltage $U_L$, the maximum charging current $I_L$ at the minimum internal resistance $R_i$ can be reduced. This means that a charger with a lower maximum charging current $I_L$ is sufficient.

Figure 7:
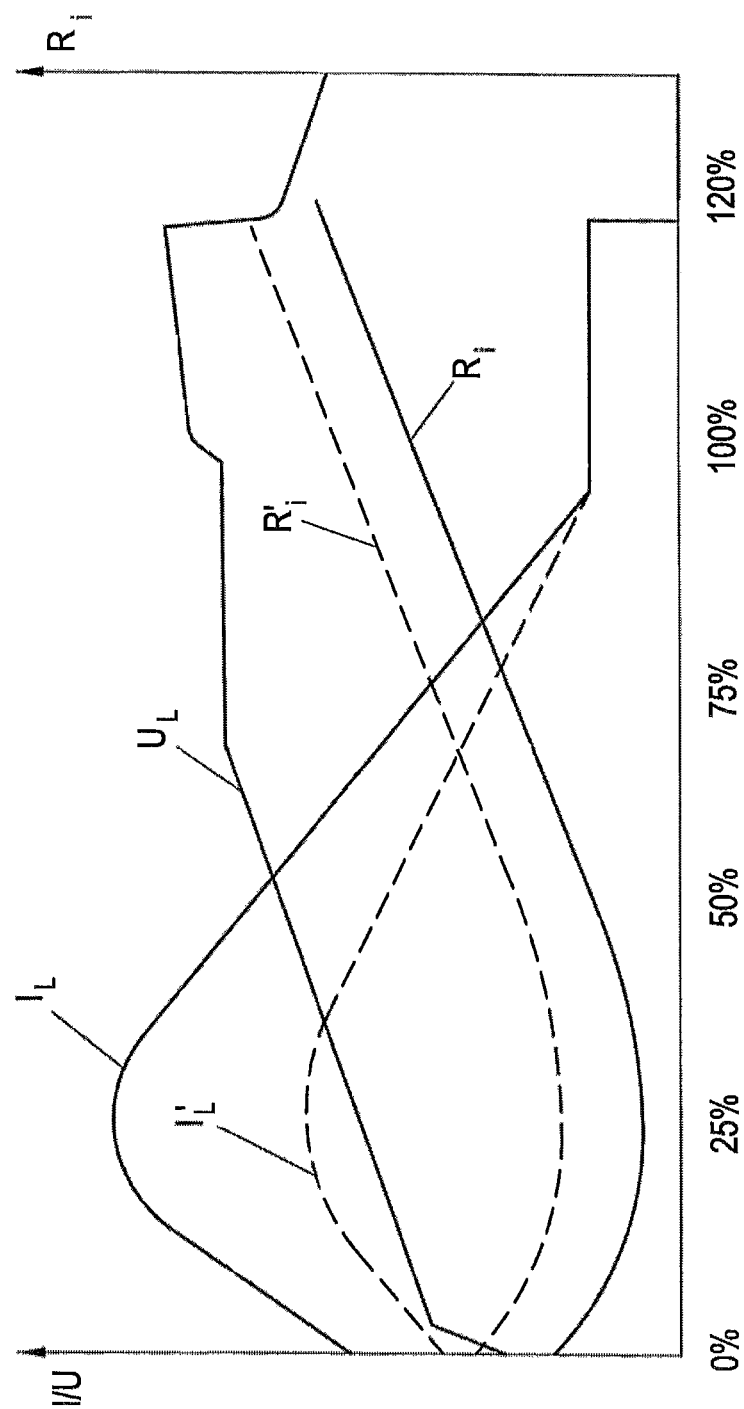
FIG. 7 shows the profiles of the charging current, the charging voltage and the internal resistance of a battery as a function of the charge state in the case of different aging states of the battery.

FIG. 7 shows the profiles of the charging current $I_L$, the charging voltage $U_L$ and the internal resistance $R_i$ of a battery as a function of the charge state in the charging process according to the invention with a different state of aging of the battery. While the internal resistance $R_i$ is lower in a battery that is as good as new, it rises accordingly as the battery ages. The curve $R'_i$ shows the profile of the internal resistance $R_i$ of an aging battery. In the charging process according to the invention, the charging voltage $U_L$ is correspondingly imposed and therefore remains unchanged, irrespective of the age of the battery. The charging current $I_L$, on the other hand, which is controlled accordingly in order to achieve the required profile of the charging voltage $U_L$, is reduced accordingly with an aging battery, due to the higher internal resistance $R'_i$. This is illustrated by the profile of the charging current $I'_L$.

Figure 8:
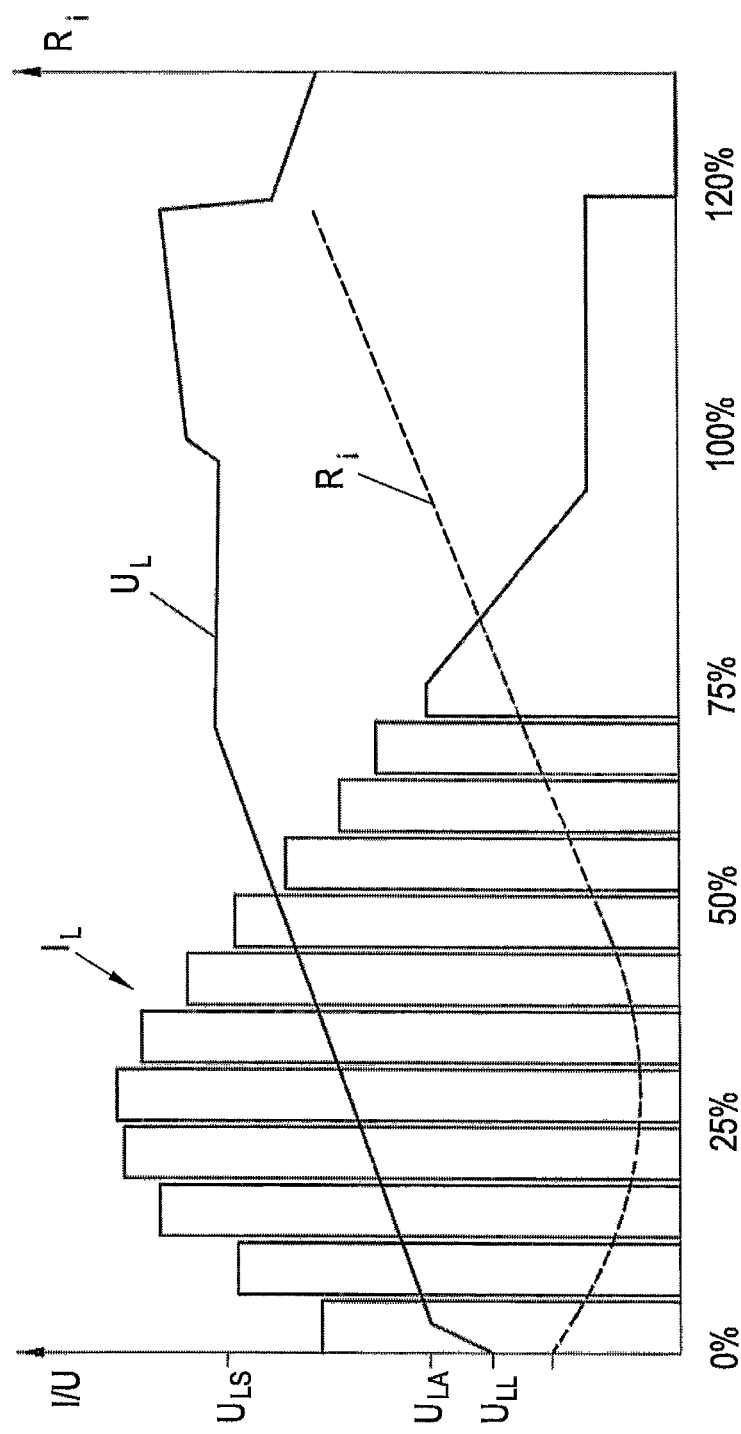
FIG. 8 shows an alternative of the charging process with current pulses.

FIG. 8 shows the profiles of the charging current $I_L$, the charging voltage $U_L$ and of the internal resistance $R_i$ of a battery as a function of the charge state in the charging process according to the invention using current pulses which are controlled accordingly in order to achieve the ramp-shaped profile of the charging voltage $U_L$. The profile of the charging voltage $U_L$ is only depicted schematically in this case. In reality, the charging voltage $U_L$ will not rise linearly but will exhibit changes according to the pulses of the charging current $I_L$. In the intervals between two current pulses, the internal resistance $R_i$ is measured and included in the control of the charging current $I_L$, in that the charging current $I_L$ is controlled as a function of the measured internal resistance $R_i$. In order to measure the internal resistance $R_i$, a drop in current to a particular value is sufficient; it is not necessary for the current to be reduced to zero. In order to detect the complex internal resistance $R_i$ of the battery, the voltage response is detected over a given time and the internal resistance $R_i$ calculated from this. Instead of current pulses, voltage pulses can also be imposed. However, this variant is more complex in terms of control.

Figure 9:
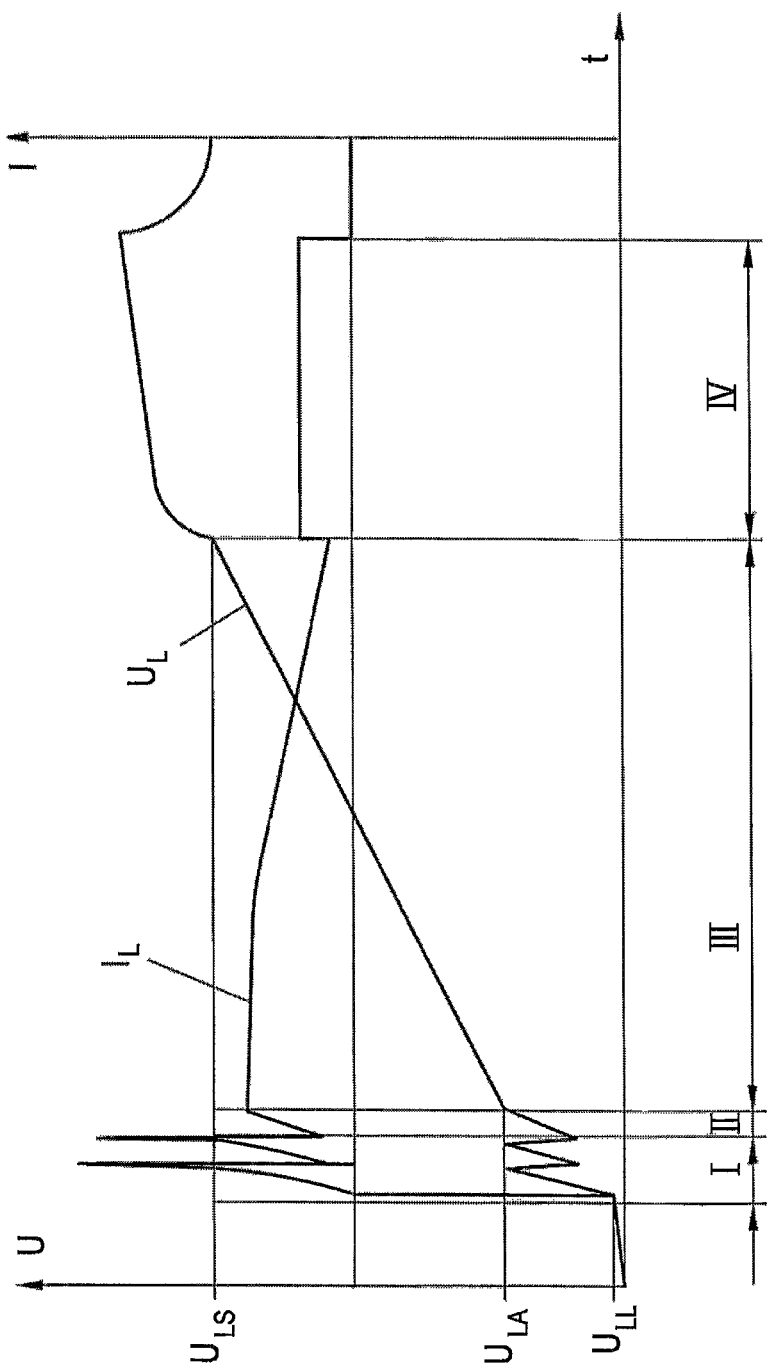
FIG. 9 shows the temporal profiles of the charging current and the charging voltage of the battery in an example of the charging process according to the invention.

Finally, FIG. 9 shows the temporal profiles of the charging current $I_L$ and the charging voltage $U_L$ of the battery in an example of the charging process according to the invention. During the charging phase III, the charging current gradually drops, as a result of which losses during charging can be reduced.

The charging process according to the invention causes greater overall efficiency and, due to the lower temperature increase resulting from this, an increase in battery service life and therefore an increase in the battery's availability for use, for example in an industrial vehicle. Consequently, there is also less water loss in the battery. Optimum utilization of the entire charging time $t_{charging}$ or else the net charging time $t'_{charging}$ also means that the battery can be charged gradually. Exploiting times when energy is cheaper, for example off-peak electricity, may also result in further financial advantages. For example, there may also be a delay by an interval of time $\Delta t_v$ (not shown) before the charging phase is initiated.

The invention claimed is:

1. A method for charging batteries, with a predetermined end-of-charge voltage, wherein the charge state of the battery is determined before the charging process and a charging current or a charging voltage is applied to the battery during the charging process over a predetermined charging time, and wherein the charging current is controlled such that the charging voltage is increased linearly between a start-of-charge voltage according to the state of charge of the battery and an end-of-charge voltage over the predetermined charging time.

2. The battery charging method according to claim 1, wherein the charging current is controlled such that the charging voltage is continuously increased during the charging time.

3. The battery charging method according to claim 1, wherein the charging current may also be increased incrementally during the charging time, and wherein the internal resistance of the battery is measured via current and voltage pulses and the charging current is adjusted accordingly to the measured internal resistance.

4. The battery charging method according to claim 1, wherein a message is displayed when the charging current required to achieve the charging voltage during the charging time is above a maximum possible charging current.

5. The battery charging method according to claim 1, wherein a lower threshold value for the charging time is displayed, within which value the battery can be charged with the maximum charging current possible until the end-of-charge voltage is reached.

6. The battery charging method according to claim 1, wherein the charge state of the battery is determined by measuring the current open-circuit voltage.

7. The battery charging method according to claim 6, wherein the battery is depolarized prior to the charging process when the open-circuit voltage lies below a predetermined threshold value, in that the charging current ($I_L$) is controlled such that a voltage ramp is produced between the battery's open-circuit voltage and a defined depolarisation voltage.

8. The battery charging method according to claim 7, wherein the depolarization voltage ramp is repeated at least once.

9. The battery charging method according to claim 1, wherein once the charging process is complete and the end-of-charge voltage has been reached, recharging can take place.

10. The battery charging method according to claim 1, wherein the charging time is determined as the difference between a predetermined end time of the charging process and the current time.

11. The battery charging method according to claim 1, wherein the predetermined charging time can be reduced to a fraction.

12. The battery charging method according to claim 1, wherein the start of the charging process is delayed by a period of time.

13. The battery charging method according to claim 12, wherein a maximum possible interval of time for delaying the charging process is suggested and displayed.

14. A device for charging batteries, with a predetermined end-of-charge voltage, with terminals for connecting to the battery, with an input/output device and a control device, wherein a device for determining the charge state of the battery is provided, furthermore a charging time can be specified at the input/output device, and wherein the control device is designed to control the charging current such that the charging voltage is increased linearly during the predetermined charging time of the battery between a start-of-charge voltage according to the state of charge of the battery and an end-of-charge voltage.

15. The battery charging device according to claim 14, wherein the input/output device is created by a touchscreen.

16. The battery charging device according to claim 14, wherein the control device is designed to control the charging current, resulting in a continuous increase in the charging voltage over the charging time between the start-of-charge voltage and the end-of-charge voltage.

17. The battery charging device according to claim 14, wherein the control device is designed to increase the charging voltage incrementally during the charging time between the start-of-charge voltage and the end of charge voltage, and wherein a device is provided for measuring or calculating the internal resistance of the battery between the pulses of the charging current, which device is connected to the control device, so that an adjustment of the charging current to the measured internal resistance can be carried out.

18. The battery charging device according to claim 14, wherein the input/output device is designed to display a message when the charging current required to achieve the charging voltage during the charging time is above a maximum possible charging current.

19. The battery charging device according to claim 14, wherein the input/output device is designed to display a lower threshold value for the charging time, within which the battery can be charged with the maximum possible charging current until the end-of-charge voltage is reached.

20. The battery charging device according to claim 14, wherein the device for establishing the charge state of the battery is formed by a device for measuring the current open-circuit voltage of the battery.

21. The battery charging device according to claim 14, wherein the input/output device is designed for entering an end time of the charging process at which the battery should be fully charged and that the control device is designed to establish the charging time as the difference between the predetermined end time of the charging process and the current time.

22. The battery charging device according to claim 14, wherein the control device is designed to delay the charging process by an interval of time.

23. The battery charging device according to claim 22, wherein the input/output device is designed to display a maximum possible interval of time for the delay of the charging process.

* * * * *